United States Patent
Stiles et al.

Patent Number: 6,021,471
Date of Patent: Feb. 1, 2000

[54] MULTIPLE LEVEL CACHE CONTROL SYSTEM WITH ADDRESS AND DATA PIPELINES

[75] Inventors: David R. Stiles, Los Gatos; Teresa A. Roth, Redwood City, both of Calif.

[73] Assignee: Advanced Micro Devices, Inc., Sunnyvale, Calif.

[21] Appl. No.: 08/340,176

[22] Filed: Nov. 15, 1994

[51] Int. Cl.[7] .................................................. G06F 9/38
[52] U.S. Cl. .......................... 711/140; 711/150; 711/168; 711/169; 711/122
[58] Field of Search .................................. 395/467, 496, 395/477, 495, 449, 446, 382; 711/119, 122, 140, 150, 168, 169; 712/206

[56] References Cited

U.S. PATENT DOCUMENTS

| | | | |
|---|---|---|---|
| 4,345,309 | 8/1982 | Arulpragasam et al. | 711/140 |
| 4,392,200 | 7/1983 | Arulpragasam et al. | 711/140 |
| 4,773,041 | 9/1988 | Hassler et al. | 395/421.03 |
| 4,965,764 | 10/1990 | Aono | 395/496 |
| 5,148,536 | 9/1992 | Wifek et al. | 711/140 |
| 5,163,140 | 11/1992 | Stiles et al. | 711/140 |
| 5,214,765 | 5/1993 | Jensen | 713/600 |
| 5,345,576 | 9/1994 | Lee et al. | 395/425 |
| 5,353,426 | 10/1994 | Patel et al. | 711/118 |
| 5,379,379 | 1/1995 | Becker et al. | 395/250 |
| 5,386,547 | 1/1995 | Jouppi | 711/122 |
| 5,490,261 | 2/1996 | Bean et al. | 711/121 |
| 5,509,137 | 4/1996 | Itomitsu et al. | 395/495 |
| 5,510,934 | 4/1996 | Brennan et al. | 395/446 |
| 5,517,657 | 5/1996 | Rodgers et al. | 395/800 |
| 5,535,360 | 7/1996 | Cassetti | 711/140 |
| 5,542,058 | 7/1996 | Brown, III et al. | 395/375 |
| 5,542,062 | 7/1996 | Taylor et al. | 395/403 |
| 5,551,001 | 8/1996 | Cohen et al. | 395/449 |
| 5,551,010 | 8/1996 | Iino et al. | 395/496 |
| 5,553,270 | 9/1996 | Rosenbluth | 395/496 |
| 5,555,392 | 9/1996 | Chaput et al. | 711/118 |
| 5,557,763 | 9/1996 | Senter et al. | 395/800 |
| 5,561,782 | 10/1996 | O'Connor | 395/467 |
| 5,564,034 | 10/1996 | Miyake | 711/128 |
| 5,603,004 | 2/1997 | Kurpanek et al. | 711/118 |
| 5,699,551 | 12/1997 | Taylor et al. | 711/207 |
| 5,740,398 | 4/1998 | Quattromani et al. | 711/117 |

*Primary Examiner*—Eddie P. Chan
*Assistant Examiner*—Hong Kim
*Attorney, Agent, or Firm*—Townsend and Townsend and Crew LLP

[57] ABSTRACT

A cache controller for a system having first and second level cache memories. The cache controller has multiple stage address and data pipelines. A look-up system allows concurrent look-up of tag addresses in the first and second level caches using the address pipeline. The multiple stages allow a miss in the first level cache to be moved to the second stage so that the latency does not slow the look-up of a next address in the first level cache. A write data pipeline allows the look-up of data being written to the first level cache for current read operations. A stack of registers coupled to the address pipeline is used to perform multiple line replacements of the first level cache memory without interfering with current first level cache memory look-ups.

5 Claims, 4 Drawing Sheets

MULTIPLE LEVEL CACHE CONTROL SYSTEM WITH ADDRESS AND DATA PIPELINES

This application is related to application No. 405,268, filed Mar. 13, 1995, U.S. Pat. No. 5,826,052.

BACKGROUND OF THE INVENTION

The present invention relates to cache control systems for fast cache memories in a microprocessor-based computer system. In particular, the invention relates to systems using first and second level caches, and to the replacement of first level cache lines with lines from the second level cache.

Many computer systems today use cache memories to improve the speed of access of more frequently used data and instructions. A small cache memory may be integrated on the microprocessor chip itself, thus greatly improving the speed of access by eliminating the need to go outside the chip and access data or instructions from an external DRAM memory. Another system uses a second level cache as well which is typically made up of SRAM memory chips outside the microprocessor. Access to the SRAM chips is much faster than access to the DRAM chips. The SRAM chips are much more expensive than the DRAM chips, however, so it is not cost effective to simply replace all the DRAM chips with SRAMs. Typically, a small first level cache is integrated on the microprocessor chip itself for the most frequently used data and instructions. A larger second level SRAM cache is used to store a larger amount of data and instructions, but less than the full memory.

During a normal data accessing routine, the microprocessor will first look in the first level cache to see if the desired data or instructions are resident there. If they are not, it will then go to the second level cache. If they are not resident in the second level cache, it will then go to the DRAM system memory.

The first level cache is a subset of the second level cache, which is a subset of the main memory. When writing to a memory location, a write to the first level cache must be copied to the second level cache and the main memory as well to maintain consistency. The writing to the second level cache will use up cycle time on the bus which will sometimes delay the processing of a next instruction while this "housekeeping" function of making the first level and second level caches consistent is being performed. In other situations, one of more lines from the second level cache may be brought into the first level cache even though they are not immediately needed by the microprocessor.

Some delays are especially significant when central processing unit designs attempt to achieve higher throughput by incorporating parallelism and pipelining. For example, an attempt to read something which is being copied from the second-level cache to the first level cache requires waiting for the copy to be completed, or accessing the second level cache a second time.

SUMMARY OF THE INVENTION

The present invention provides a cache controller for a system having a first level cache memory and a second level cache memory. The cache controller has a multiple stage address pipeline. A look-up control system associated with the address pipeline allows the concurrent look-up of tag addresses in the first and second level caches. If there is not a hit for a first stage pipeline in the first level cache, that address is moved to the second stage for look-up in the second level cache, while a new address can be entered into the first stage for look-up in the first level cache. This avoids having to stall the machine while a first level cache miss is doing a subsequent comparison with second level cache tags.

The present invention also preferably provides comparison circuitry to allow a read address to be compared with addresses in the address pipeline, and thus determine if there is a hit on an address not currently in the first level cache, but which is about to be written to the first level cache. A data pipeline is provided corresponding to the address pipeline for storing write data, which is thus readily available if there is a read hit upon an address in the address pipeline. Preferably, two pipelines are provided, one for write data and another one for data read from the cache.

The purpose of the multiple stage address pipeline is to allow execution of read operations at the bandwidth of one per cycle, even in the presence of L1 cache misses and the longer latencies to the L2 cache. Reads following a cache miss compare themselves against other addresses in the pipeline to detect cases when a pending L2 reference is to the same cache line. In the case of a match, L2 status lookups can be avoided. If the pending reference is bringing in a particular portion of a cache line, that cache line may contain the data required for subsequent reads. The address and data pipelines provide a mechanism for detecting this case and returning read data with no additional latency.

The present invention also provides a method and apparatus for performing multiple line replacements of a first level cache memory from a second level cache memory. A latch is provided to hold the address of the next line of the second level cache memory to be accessed. This is coupled to a stack of registers for holding the multiple line replacement addresses. A multiplexing mechanism is provided for putting either the next address from the stack into a latch for a second level cache access, or selecting a higher priority access, such as an access required on a cache miss in the first level cache memory.

In a preferred embodiment, the latch for the second level cache address is part of the address pipeline connected to the stack. The pipeline provides the addresses for both the second level cache and the first level cache. The corresponding data pipeline holds data to be written to the first level cache.

In a preferred embodiment of the cache controller, separate queues are provided for instruction fetches, memory reads and memory writes. The first level cache itself is preferably broken into two caches, one for instructions and one for data.

Programs commonly exhibit a bursty cache miss pattern. The probability of a cache miss is much higher when other cache misses have been detected in the recent past. Typical multi-level cache control systems perform these bursts of cache misses one miss at a time, in the order in which they are detected. Since a cache miss requires many processor cycles to completely copy the L2 cache line into the L1 cache line, later cache misses are detected many cycles before L2 cache bandwidth is allocated to fetching the required data.

The fetch stack described in this invention allows the hardware to smooth out the bursty nature of cache misses. Each cache miss detected by the processor results in a single read of the L2 cache to acquire the data needed immediately by the processor. In the event that no other cache misses are pending, the rest of the L2 cache line is fetched on subsequent cycles. However, when a second cache miss is pending, the first cache miss is pushed onto the fetch stack and the single read for the second cache miss is done immediately. Once data has been returned to the processor for the second miss, the remainder of the second cache line will be copied from L2 to L1. Then the first cache miss will be "popped" from the fetch stack and the remainder of the first cache line will be copied from L2 to L1.

In the preferred embodiment, the fetch stack contains multiple entries, allowing multiple cache line replacements to be interrupted for higher priority processor misses, and allowing the remainder of each cache line fill to be completed when cache misses become less frequent. During the period of time that an in-progress replacement is held in the fetch stack, processor reads are looked up in the fetch stack as well as in the L1 cache. A cache miss which is found to be in progress (i.e. hits in the fetch stack) does not need to perform an L2 lookup before accessing the required data. The data can be fetched immediately using cache status information in the fetch stack. This mechanism eliminates any performance disadvantage due to deferring completion of cache line fills by avoiding any duplicate L2 tag and status references.

A further understanding of the nature and advantages of the present invention may be realized by reference to the following description in conjunction with the accompanying drawings.

DETAILED DESCRIPTION OF THE PREFERRED EMBODIMENTS

Figure 1:
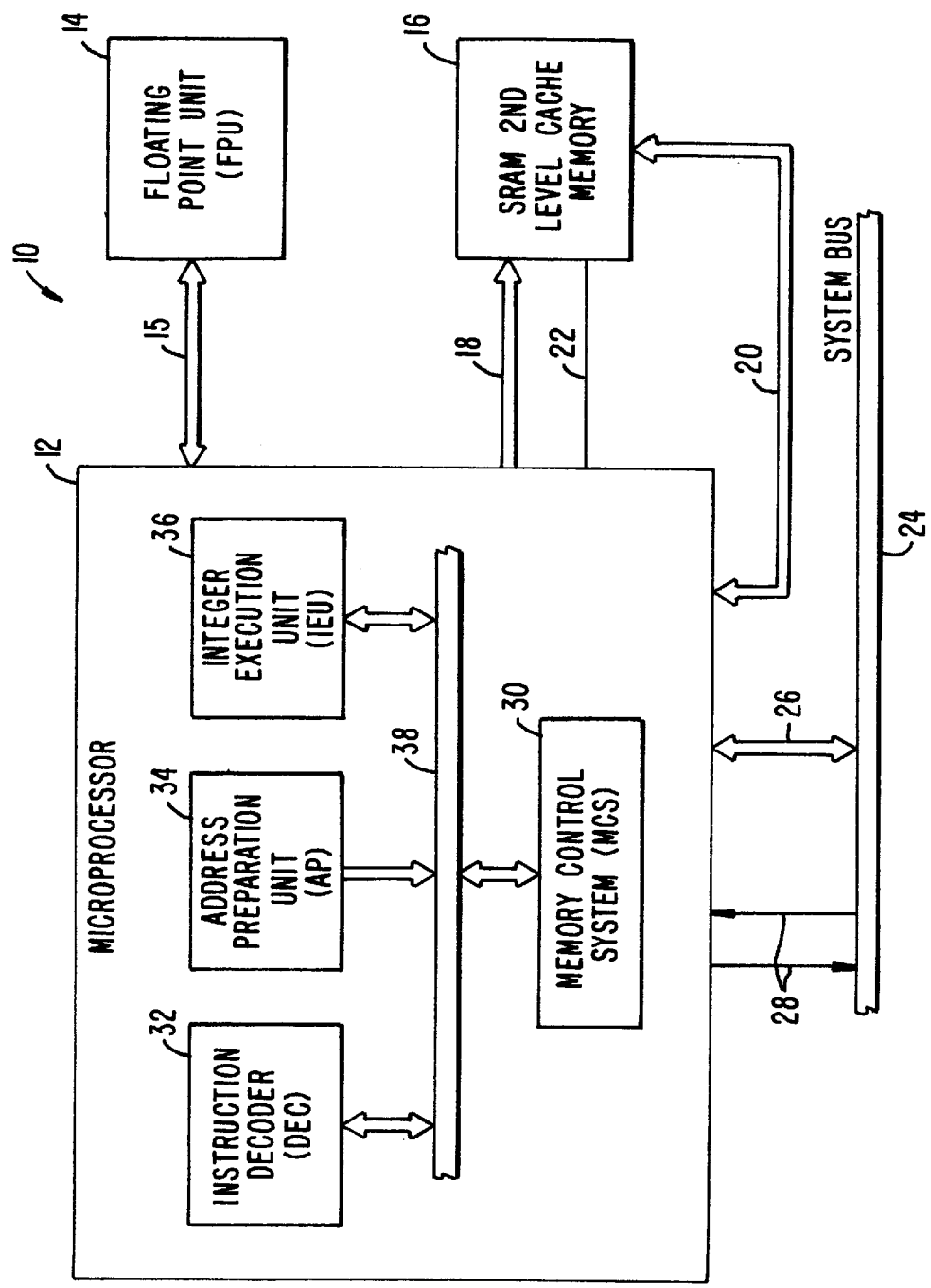
FIG. 1 is a block diagram of a computer system in which the present invention would reside.

FIG. 1 shows a computer system 10 having a microprocessor 12 on a single chip. A separate chip 14 is a floating point unit connected to microprocessor 12. An SRAM based in the second level cache memory 16 is connected to microprocessor 12. Memory 16 is connected to the microprocessor by an address bus 18, data bus 20 and control lines 22. The floating point unit 14 is coupled by a bus 15 to the microprocessor. A system bus 24 is connected to the microprocessor through address and data bus 26 and control lines 28. The system bus connects to the main DRAM memory.

The microprocessor is shown as including a memory control system (MCS) 30 including the present invention. The microprocessor includes an instruction decoder (DEC) 32 which performs instruction fetch, instruction decode and pipeline control. This unit can interleave instruction prefetches of up to three simultaneous instruction streams and it contains a fully-associative branch prediction cache which is described in U.S. Pat. No. 5,093,778. An address preparation unit 34 calculates effective addresses, performs segment relocation and implements a demand page memory management system. It contains a translation look-aside buffer.

An integer execution unit (IEU) 36 performs single cycle execution of most integer instructions. It contains a multiplier and accumulator array, as well as microcode for multiply and divide instructions. The pipeline control architecture allows the IEU to perform parallel and/or out-of-order execution of integer instructions. A more complete description of these units is contained in U.S. Pat. No. 5,226,126, issued Jul. 6, 1993, hereby incorporated by reference. The DEC, AP and IEU units communicate with MCS 30 through internal buses 38.

Figure 2:
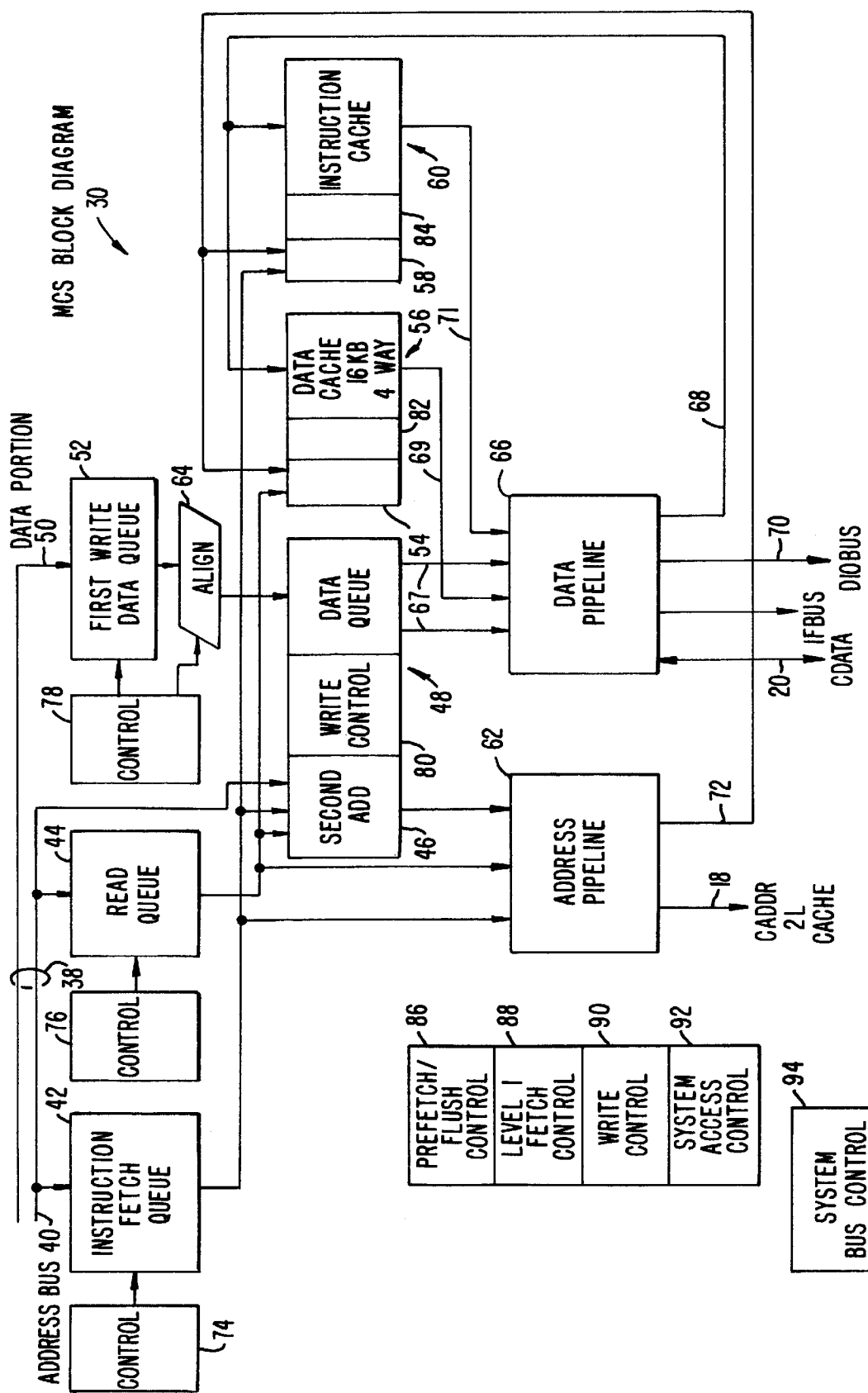
FIG. 2 is a block diagram of the memory cache system of FIG. 1.

FIG. 2 is a block diagram of MCS 30 of FIG. 1. Internal microprocessor buses 38 are shown at the top. An address bus 40 (a portion of buses 38) is provided to an instruction fetch queue 42, a read queue 44 and the address portion 46 of a second write data queue 48. The data portion 50 of bus 38 is provided to a first write data queue 52.

The addresses from the instruction fetch queue and read queue can be provided directly to the address portion 54 of the data cache 56, and the address portion 58 of an instruction cache 60 respectively. The addresses are also provided to an address pipeline 62, which has an output going to the data and instruction caches as well.

The data from the first write data queue 52 is aligned in an alignment circuit 64 and provided to the second write data queue 48. The data from write queue 48 is provided to a data pipeline 66 on bus 67. Data pipeline 66 provides data to the data and instruction caches on bus 68. The data pipeline also provides data to the off chip, second level cache 16 of FIG. 1 on data lines 20. Data is also provided back to the processor units on data bus 70, which is part of bus 38 shown in FIG. 1. Read data from the data and instruction caches are provided to the data pipelines on buses 69 and 71, respectively.

The address pipeline provides addresses to the first level data and instruction caches 56 and 58 on bus 72, and provides addresses to the external second level cache 16 of FIG. 1 on address bus 18.

Various control circuits are shown for the different elements of FIG. 2. A controller 74 is provided for instruction fetch queue 42, a controller 76 for read queue 44 and a controller 78 for first write data queue 52. Second write data queue 48 includes a controller 80, first level data cache 56 includes a controller 82, and first level instruction cache 60 includes a controller 84. In addition, several control circuits are shown without the various connections extending throughout the block diagram. These are prefetch/flush controller 86, level one fetch controller 88, write controller 90 and system access controller 92. Finally, a system bus controller 94 is shown.

Figure 3:
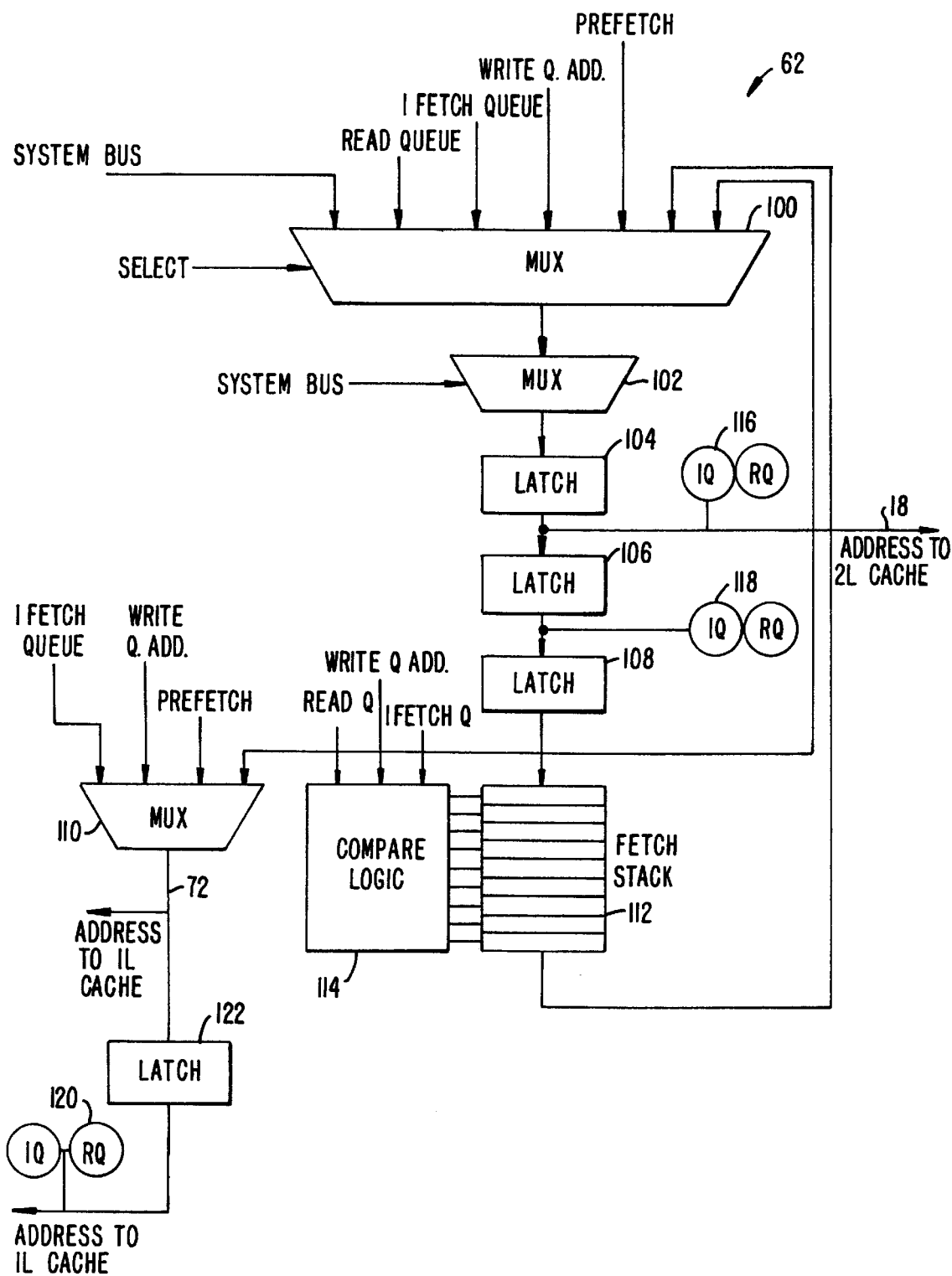
FIG. 3 is a block diagram of the address pipeline of FIG. 2.

FIG. 3 is a block diagram of the address pipeline 62 of FIG. 2. The addresses from the various other units of FIG. 2 are provided to a multiplexer 100. Specifically, addresses from Read Queue 44, I Fetch Queue 42, Write Q. Add. 46, and Prefetch/Flush Ctrl. 86 of FIG. 2 are provided to multiplexer 100. The output of this multiplexer is provided to a second multiplexer 102, and then to a three-stage pipeline consisting of latches 104, 106 and 108. The output of latch stage 104 is provided as an address to the second level cache 16 of FIG. 1 on address lines 18. The output of latch stage 108 is provided through a multiplexer 110 to the first level cache memories 56 and 60 of FIG. 2 on address lines 72. Addresses from I Fetch Queue 42, Write Q. Add. 46, and Prefetch/Flush Ctrl. 86 (all of FIG. 2) are also provided through multiplexer 110 to the first level cache memories 56 and 60 of FIG. 2.

A fetch stack of registers 112 is coupled between latch 108 and an input of multiplexer 100. This is a pushdown stack which is used for cache line replacements. In particular, when a multiple-cycle replacement from the second level cache to the first level cache is to be done, the addresses are stored in the fetch stack and sequentially fed to the address pipeline of latches 104, 106 and 108. In the event of a higher priority need to go to the second level cache, multiplexer 100 can select another address for putting into latch 104, rather than an address from the fetch stack. After that second level cache access is completed, the replacement of the cache lines with the addresses in the fetch stack 112 can be resumed.

Coupled to stack 112 is compare logic 114. This logic has inputs from the read queue, write queue add and instruction fetch queue of FIG. 2. This allows a comparison to be done of in-progress second level to first level cache replacements in parallel with a first level cache look-up. This avoids the need to do yet another second level cache look-up to determine if the desired information is in the second level cache, since this information is provided in the fetch stack 112.

In addition to compare logic 114, three different comparison circuits indicated as IQ or RQ in circles are provided for doing comparisons with instruction queue and read queue addresses, respectively. These are comparison circuits 116, 118 and 120 coupled to the outputs of latches 104, 106 and 122, respectively. This allows the controller to determine if reads or instruction fetches are present in the address pipeline. If the reads or instruction fetches are present in the address pipeline, the corresponding addresses or data are already being accessed from either the first level cache or the second level cache, and the data is already in or about to be placed in the data pipeline. Accordingly, a subsequent access is not necessary since one is already in progress. Thus, a short circuit of the accessing procedure is possible.

Figure 4:
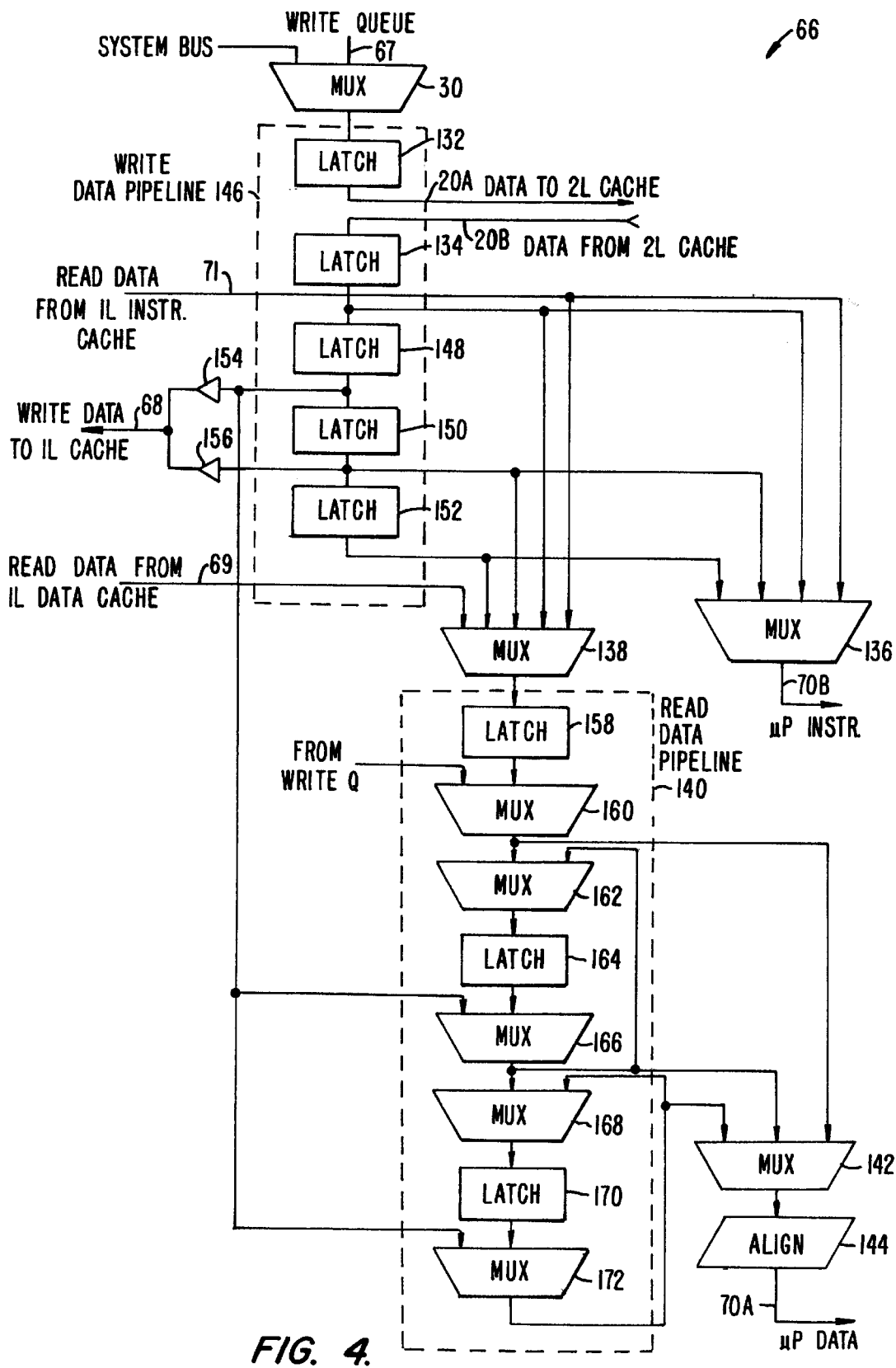
FIG. 4 is a block diagram of the data pipeline of FIG. 2.

FIG. 4 is a block diagram of data pipeline 66 of FIG. 2. Write data from write queue 48 of FIG. 2 is provided on bus 67 to a multiplexer 130. The output of the multiplexer through latch 134 and multiplexer 136 is used for providing instructions back to the microprocessor on bus 70B. It is also available to be provided through multiplexer 138 to a read data pipeline 140. The path through read data pipeline 140 is used for providing data back to the microprocessor on bus 70A through a multiplexer 142 and alignment circuit 144. The data provided through multiplexer 136 is instructions which are provided to the microprocessor instruction register through bus 70B.

Latches 132 and 134 form part of a write data pipeline 146 which also includes latches 148, 150 and 152. The outputs of latches 148 and 150 are provided through transceivers 154 and 156, respectively, to bus 68 which connects to the write data input of the first level instruction and data caches. The output latch 152 is provided to the multiplexers 138 and 136 for return to the microprocessor. Read data from the first level instruction cache is provided on bus 71 to both multiplexers 138 and 136. Read data from the first level data cache is provided on bus 69 to only the multiplexer 138 for the read data pipeline 140. Since the read data will never have instructions, it is only provided to this pipeline, while the instruction cache may have immediate data, and thus is provided to both the multiplexer 136 for return to the instruction register and to multiplexer 138 for provision to the read pipeline. The multiplexers allow data in the data pipeline 146 to be provided to the microprocessor upon a hit on a corresponding address in the address pipeline.

Write data pipeline 146 stores in multiple stages the data to be written to either the first level instruction or data caches from either the second level cache on bus 20B or from main memory. If either data or instructions in the write data is detected by a hit on a corresponding address in the address pipeline, the data can be directly provided to the microprocessor from any of the stages through multiplexer 138 and read pipeline 140 to the microprocessor data bus 70A. Alternately, if it is an instruction which is detected, this can also be provided from any of the multiple stages through multiplexer 136 to the microprocessor instruction bus 70B.

Read data pipeline 140 includes a latch 158 which is provided to a multiplexer 160. The other input of multiplexer 160 comes from the write queue directly. A second multiplexer 162 can provide its output directly to the microprocessor through multiplexer 142, and receives additional feedback input from a subsequent stage in the pipeline. Another latch 164 is provided, with another multiplexer 166 having additional input from an intermediate stage of write data pipeline 146. This is followed by multiplexer 168, latch 170 and final multiplexer 172. The multiplexers allow for input of data at different portions of the read pipeline from the write data pipeline, as well as the outputting of data from different portions to the microprocessor through multiplexer 142. In addition, feedback loops are provided to allow data to be recycled or reordered in the pipeline.

As will be understood by those familiar with the art, the present invention may be embodied in other specific forms without departing from the spirit or essential characteristics thereof. For example, a two-stage or single stage address pipeline could be used with the fetch stack of the present invention. Accordingly, the disclosure of the preferred embodiments of the present invention is intended to be illustrative, but not limiting, of the scope of the invention which is set forth in the following claims.

What is claimed is:

1. In a cache controller for a system having a first level cache memory and a second level cache memory, said cache controller comprising:

a multiple stage address pipeline for holding at least first and second different addresses;

a look-up control system, simultaneously coupled to more than one stage of said address pipeline, configured to, upon a miss of said first address in said first cache, compare said first address with tag addresses in said second cache while concurrently comparing said second address with tags in said first cache;

a multiple stage data pipeline for storing data corresponding to said first and second addresses;

a fetch stack for holding addresses for data to be fetched from said second level cache into said first level cache;

a multiplexer, coupled to said fetch stack and to said multiple stage address pipeline, for selecting between said fetch stack and said multiple stage address pipeline so that a portion of a second level cache line other than an address immediately needed is provided through said multiplexer when no subsequent first level cache miss is pending; and a first level cache address latch coupled to an output of said multiplexer.

2. The cache controller of claim 1 wherein said fetch stack holds addresses for portions of a second level cache line other than a portion immediately needed by said first level cache.

3. The cache controller of claim 1 wherein said fetch stack holds addresses for a plurality of second level cache lines.

4. The cache controller of claim 1 further comprising:

a second multiplexer having an output coupled to said multiple stage address pipeline;

a read address queue having an output coupled to a first input of said second multiplexer;

a write address queue having an output coupled to a second input of said second multiplexer; and compare logic coupled between each of a plurality of positions in said fetch stack and said read address and write address queues.

5. In a cache controller for a system having a first level cache memory and a second level cache memory, said cache controller comprising:

a multiple stage address pipeline for holding at least first and second different addresses;

a look-up control system, simultaneously coupled to more than one stage of said address pipeline, configured to, upon a miss of said first address in said first cache, compare said first address with tag addresses in said second cache while concurrently comparing said second address with tags in said first cache;

a multiple stage data pipeline for storing data corresponding to said first and second addresses;

a fetch stack for holding addresses for data to be fetched from said second level cache into said first level cache, wherein said fetch stack holds addresses for portions of a second level cache line other than a portion immediately needed by said first level cache;

a first multiplexer, coupled to said fetch stack and to said multiple stage address pipeline, for selecting between said fetch stack and said multiple stage address pipeline so that a portion of a second level cache line other than an address immediately needed is provided through said first multiplexer when no subsequent first level cache miss is pending;

a first level cache address latch coupled to an output of said first multiplexer;

a second multiplexer having an output coupled to said multiple stage address pipeline;

a read address queue having an output coupled to a first input of said second multiplexer;

a write address queue having an output coupled to a second input of said second multiplexer; and compare logic coupled between each of a plurality of positions in said fetch stack and said read address and write address queues.

* * * * *